United States Patent [19]
Schachter

[11] Patent Number: 6,002,664
[45] Date of Patent: *Dec. 14, 1999

[54] METHOD TO GAIN ACCESS TO A BASE STATION IN A DISCRETE MULTITONE SPREAD SPECTRUM COMMUNICATIONS SYSTEM

[75] Inventor: Paul Joseph Schachter, Seattle, Wash.

[73] Assignee: AT&T Wireless Services Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/806,507

[22] Filed: Feb. 24, 1997

[51] Int. Cl.[6] .............................. H04J 13/02; H04B 7/216
[52] U.S. Cl. ..................... 370/207; 370/210; 370/320; 370/335; 375/200; 375/206; 375/350
[58] Field of Search ..................................... 370/320, 335, 370/342, 206, 207, 280, 210, 445; 375/200, 202, 206, 298, 346, 348, 350; 455/507, 517, 59–61, 63, 67.1, 67.3

[56] References Cited

U.S. PATENT DOCUMENTS

| 4,639,914 | 1/1987 | Winters | 370/334 |
|---|---|---|---|
| 4,807,222 | 2/1989 | Amitay | 359/136 |
| 4,841,527 | 6/1989 | Raychaudhuri et al. | 370/342 |
| 5,048,057 | 9/1991 | Saleh et al. | 375/267 |
| 5,084,869 | 1/1992 | Russell | 370/329 |
| 5,136,612 | 8/1992 | Bi | 370/342 |
| 5,305,308 | 4/1994 | English et al. | 370/335 |
| 5,521,937 | 5/1996 | Kondo et al. | 375/206 |
| 5,544,196 | 8/1996 | Tiedemann, Jr. et al. | 375/200 |
| 5,546,422 | 8/1996 | Yokev et al. | 375/202 |
| 5,559,789 | 9/1996 | Nakano et al. | 370/342 |
| 5,638,361 | 6/1997 | Ohlson et al. | 370/342 |
| 5,654,955 | 8/1997 | Natali | 370/320 |
| 5,696,762 | 12/1997 | Natali et al. | 370/320 |

FOREIGN PATENT DOCUMENTS

WO 95/34149  12/1995  WIPO .

*Primary Examiner*—Alpus H. Hsu

[57] ABSTRACT

In a discrete multitone spread spectrum system, a base station distinguishes between normal collisions and noise bursts when receiving access request signals from remote units on a common access channel. The base station is then able to reply to the remote units with information about the quality of the common access channel and why their transmissions were not successful. The remote units then use this information to adapt their retry processes to the channel's quality, depending on whether there was a noise burst, a normal collision, or a successful transmission on the channel.

24 Claims, 7 Drawing Sheets

METHOD TO GAIN ACCESS TO A BASE STATION IN A DISCRETE MULTITONE SPREAD SPECTRUM COMMUNICATIONS SYSTEM

CROSS-REFERENCE TO RELATED APPLICATIONS

The invention disclosed herein is related to the U.S. patent application by Siavash Alamouti, Doug Stolarz, and Joel Becker, entitled, "VERTICAL ADAPTIVE ANTENNA ARRAY FOR A DISCRETE MULTITONE SPREAD SPECTRUM COMMUNICATIONS SYSTEM," Ser. No. 09/128,738, filed Aug. 5, 1998, which is a continuation of Ser. No. 08/937,654, filed Sep. 24, 1997, now abandoned, which is a continuation of application Ser. No. 08/806,510, filed Feb. 24, 1997, now abandoned.

BACKGROUND OF THE INVENTION

1. Field of the Invention

This invention involves communications methods that a wireless remote station uses to gain access to a base station in a discrete multitone spread spectrum communications system.

2. Description of Related Art

Wireless communications systems, such as cellular and personal communications systems, operate over limited spectral bandwidths. They must make highly efficient use of the scarce bandwidth resource to provide good service to a large population of users. Code Division Multiple Access (CDMA) protocol has been used by wireless communications systems to efficiently make use of limited bandwidths. The protocol uses a unique code to distinguish each user's data signal from other users' data signals. Knowledge of the unique code with which any specific information is transmitted, permits the separation and reconstruction of each user's message at the receiving end of the communication channel.

The personal wireless access network (PWAN) system described in the referenced Alamouti, et al. patent application, incorporated herein by reference, uses a form of the CDMA protocol known as discrete multitone spread spectrum (DMT-SS) to provide efficient communications between a base station and a plurality of remote units. In this protocol, the user's data signal is modulated by a set of weighted discrete frequencies or tones. The weights are spreading codes that distribute the data signal over many discrete tones covering a broad range of frequencies. The weights are complex numbers with the real component acting to modulate the amplitude of a tone while the complex component of the weight acts to modulate the phase of the same tone. Each tone in the weighted tone set bears the same data signal. Plural users at the transmitting station can use the same tone set to transmit their data, but each of the users sharing the tone set has a different set of spreading codes. The weighted tone set for a particular user is transmitted to the receiving station where it is processed with despreading codes related to the user's spreading codes, to recover the user's data signal. For each of the spatially separated antennas at the receiver, the received multitone signals are transformed from time domain signals to frequency domain signals. Despreading weights are assigned to each frequency component of the signals received by each antenna element. The values of the despreading weights are combined with the received signals to obtain an optimized approximation of individual transmitted signals characterized by a particular multitone set and transmitting location.

The PWAN system has a total of 2560 discrete tones (carriers) equally spaced in 8 MHz of available bandwidth in the range of 1850 to 1990 MHz. The spacing between the tones is 3.125 kHz. The total set of tones are numbered consecutively from 0 to 2559 starting from the lowest frequency tone. The tones are used to carry traffic messages and overhead messages between the base station and the plurality of remote units. The traffic tones are divided into 32 traffic partitions, with each traffic channel requiring at least one traffic partition of 72 tones.

In addition, the PWAN system uses overhead tones to establish synchronization and to pass control information between the base station and the remote units. A Common Link Channel (CLC) is used by the base to transmit control information to the Remote Units. A Common Access Channel (CAC) is used to transmit messages from the Remote Unit to the Base. There is one grouping of tones assigned to each channel. These overhead channels are used in common by all of the remote units when they are exchanging control messages with the base station.

In the PWAN system, Time Division Duplexing (TDD) is used by the base station and the remote unit to transmit data and control information in both directions over the same multi-tone frequency channel. Transmission from the base station to the remote unit is called forward transmission and transmission from the remote unit to the base station is called reverse transmission. The time between recurrent transmissions from either the remote unit or the base station is the TDD period. In every TDD period, there are four consecutive transmission bursts in each direction. Data is transmitted in each burst using multiple tones. The base station and each remote unit must synchronize and conform to the TDD timing structure and both the base station and the remote unit must synchronize to a framing structure. All remote units and base stations must be synchronized so that all remote units transmit at the same time and then all base stations transmit at the same time. When a remote unit initially powers up, it acquires synchronization from the base station so that it can exchange control and traffic messages within the prescribed TDD time format. The remote unit must also acquire frequency and phase synchronization for the DMT-SS signals so that the remote is operating at the same frequency and phase as the base station.

When a caller at a remote unit goes off-hook, an access request message is sent by the remote unit over the Common Link Channel (CLC) to the base station during the reverse TDD interval when all of the remotes are allowed to transmit. If more than one remote unit sends a message over the CAC channel during the same reverse TDD interval, there is a collision of the signal tones. If the base station receives the combined signal from the collided tones, the signal will not be intelligible. In that case the base station will reply with a negative acknowledgement signal. Alternately, if the base station never receives the collided signals, the absence of an acknowledgement signal from the base station will be inferred by both remote units as a collision. In either case, the remote units in the present PWAN system will delay repeating their transmissions by a random interval. This collision detection multiple access technique is generally known as the aloha protocol. Each remote unit will delay retransmission by a random interval, known as a back-off interval, that is usually different for the two units. The remote unit whose random interval is the first to expire, will be the first to retransmit its message.

A problem arises when the collision is not between the transmissions from two remote units, but instead is between a transmission from one remote unit and a noise burst. Noise bursts are typically of a longer duration than the typical back-off interval of the standard aloha protocol. If the remote unit infers from the base station's negative acknowledgement signal or from the lack of an acknowledgement signal that there has been a collision with a transmission from another remote station, the remote unit will not delay long enough to avoid a second collision with the noise burst when it retransmits its signal. However, the possible solution of merely lengthening the aloha back-off intervals for all detected collisions would unnecessarily delay most retransmissions after normal collisions with other remotes.

SUMMARY OF THE INVENTION

The invention solves this problem by providing the base station with the ability to distinguish between normal collisions and noise bursts on the Common Access Channel (CAC). The base station is then able to reply to the remote units with information about the quality of the CAC channel and why their CAC channel transmissions were not successful. The remote units can then use this information to adapt their retry processes to the channel's quality, depending on whether there was a noise burst, a normal collision, or a successful transmission on the CAC channel.

The CAC channel transmissions are discrete tones received by the base station from one or more remote units during each reverse interval of a TDD period. The tones have been modulated with data such as an access request by the remote unit, using a 16 QAM modulation scheme. The received tones are sampled, digitized, passed through a fast Fourier transform (FFT) processor, and stored in FFT incremental frequency bins as complex numbers. These numbers represent points in a 16 QAM modulation constellation and are related to the average amount of energy of the received tone in the increment of frequency represented by the FFT bin. In accordance with the invention, the base station uses the information about the signals received, as represented by the FFT bins, to prepare notices of CAC channel conditions to be sent back to the remote units. In a first example, with no noise on the CAC channel, the average energy of the received tone represented by the numbers in the FFT frequency bins is equal to unity. In a second example, with no noise on the CAC channel, when a collision occurs between two tones that are received by the base station at the same time from two different remote units, the average energy represented by the numbers in the FFT frequency bins is greater than unity. In a third example, with noise on the CAC channel but no transmitted tones, the average energy of the received noise will be measurable but very small. In a fourth example, with noise on the CAC channel and a tone transmitted from a remote unit, the average energy measured will be less than expected for a tone received over a quiet CAC channel. This is due to the randomness with which the noise adds to and subtracts from the tone signal. The combination of noise and a received tone on the CAC channel will be represented by the numbers in the FFT frequency bins being less than unity.

In accordance with the invention, if no noise is detected by the base station on the CAC channel, then it responds with a normal reply when a tone is received on the CAC channel from a remote unit. If noise is detected by the base station on the CAC channel when a tone is received from a remote unit, then the base station responds on the Common Link Channel (CLC) with a negative acknowledgement (NACK) signal specifying that there is noise on the CAC channel. If a collision is detected by the base station on the CAC channel when two tones have been transmitted by two remote units, then the base station responds on the CLC channel with a negative acknowledgement (NACK) signal specifying that there has been a collision on the CAC channel. In an alternate embodiment of the invention, whenever noise is detected by the base station on the CAC channel, the strength and duration and specific frequency range of the noise is measured and recorded. Only the most recent noise measurement data is retained at the base station. Then when a tone is received from a remote unit accompanied by the noise, then the base station responds on the Common Link Channel (CLC) with a negative acknowledgement (NACK) signal specifying the strength and duration and specific frequency range of the noise on the CAC channel. Alternately, the base station can periodically broadcast updates to all remote stations about the strength and duration and specific frequency range of noise bursts recently measured on the CAC channel.

In accordance with the invention, the remote unit waits for a reply on the CLC channel after it transmits an access request to the base station on the CAC channel. If the remote unit does not receive some form of response from the base unit before a timeout interval, then the remote unit infers that there is noise interference on the CAC channel and its access request did not get to the base station. Since noise bursts are typically of a longer duration than the typical back-off interval of the standard random back-off and retry protocol, the remote unit will add an extra delay period before beginning the random back-off and retry process. In an alternate embodiment of the invention, the duration of the extra delay period can vary in response to information received from the base station specifying the strength and duration and specific frequency range of the noise recently measured on the CAC channel.

If a remote unit receives a reply to its access request on the CAC channel, it analyzes the reply message to determine if it is normal reply, or if it is a NACK message indicating noise or a collision. If the base station has sent a normal reply, then the remote unit completes the access process in the normal manner. If the base station has sent a negative acknowledgement message indicating that there is noise on the CAC channel, then the remote unit will add an extra delay period before beginning the random back-off and retry process, as described above. In an alternate embodiment of the invention, the duration of the extra delay period can vary in response to information received from the base station specifying the strength and duration and specific frequency range of the noise measured on the CAC channel. If the base station has sent a negative acknowledgement message indicating that there has been a collision with the tone from another remote unit on the CAC channel, then both remote units will receive the NACK message and both will begin the random back-off and retry process.

In this manner, access requests from remote units are processed in the minimum amount of time in the face of varying traffic congestion and noise burst interference on the CAC channel.

In an alternate embodiment of the invention, the remote unit and the base station can exchange their respective request and response messages over the same frequency channel, such as a common broadcast channel. If either a collision or a noise burst is detected by the base station on the common chancel, the base station can respond on the same channel to the remote station with information on the conditions on the channel. The remote unit will respond as described above, with a selected type of back-off and retry operation, depending on the information in the response from the base station. If the base station=s response back to the remote unit in not received by the remote unit, then after a timeout interval, the remote unit will infer that there is a noise condition on the common channel.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

DETAILED DESCRIPTION OF THE PREFERRED EMBODIMENT

Figure 1A:
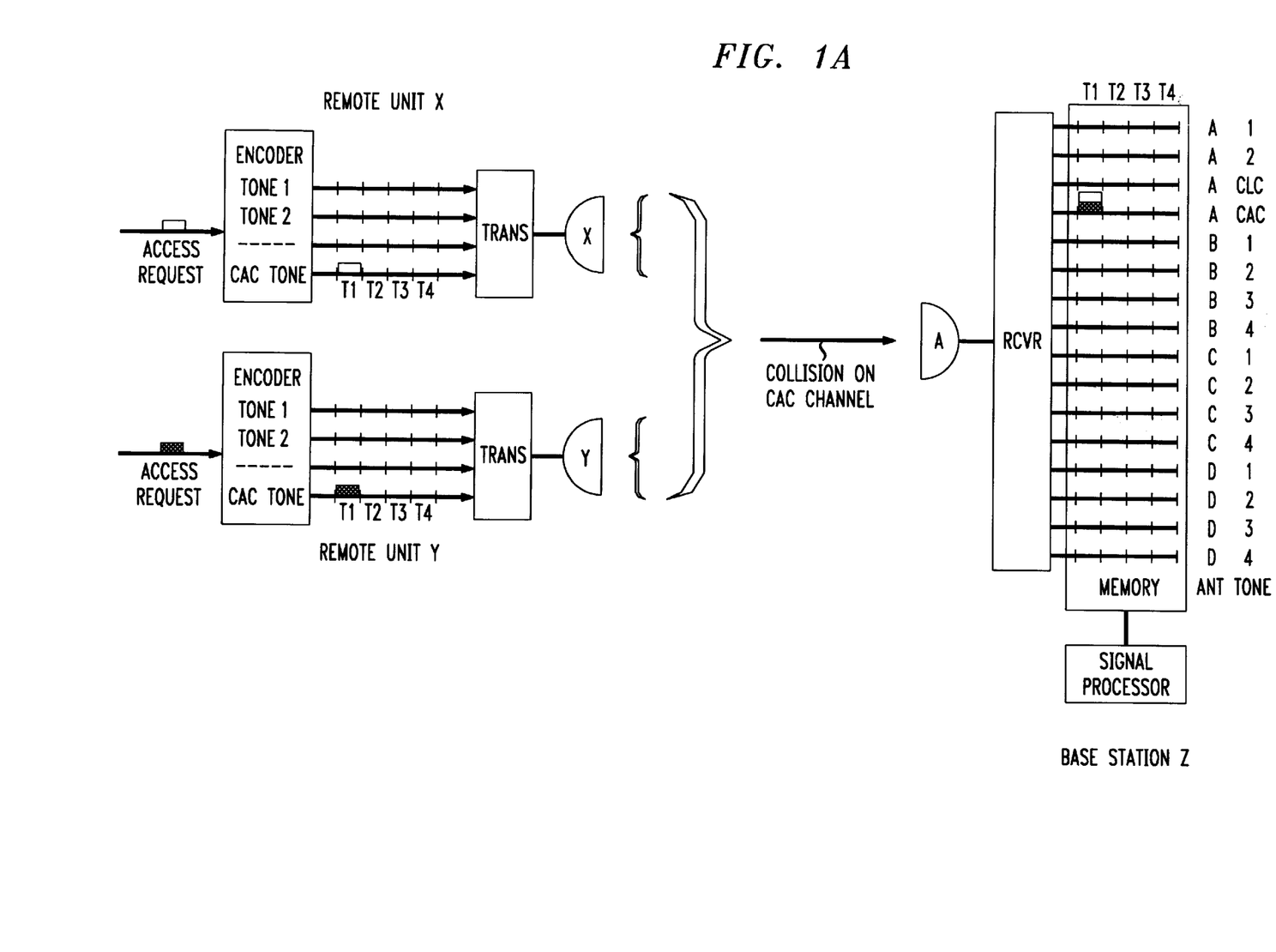
FIG. 1A is a diagram illustrating a collision on the CAC channel by two remote units attempting to gain access to the base station at the same time.

FIG. 1A is a diagram illustrating a collision on the CAC channel by tones from two remote units attempting to gain access to the base station at the same time. Remote unit X receives an access request signal shown as a white data signal from a first sender. In accordance with one aspect of the personal wireless access network (PWAN) system described in the referenced Alamouti, et al. patent application, incorporated herein by reference, the encoder uses a discrete multitone spread spectrum protocol to encode the white data signal onto multiple discrete frequencies or tones, here represented by one common access channel (CAC) tone. The white data signal is copied onto each of the CAC tones. FIG. 1A also shows remote unit Y receiving an access request signal shown as a black data signal from a second sender. In accordance with one aspect of the PWAN system, the encoder at station Y uses a discrete multitone spread spectrum protocol to encode the black data signal onto the same multiple discrete frequencies or tones, here represented by one common access channel (CAC) tone. The black data signal is copied onto each of the CAC tones. FIG. 1A shows the transmitters at remote units X and Y being positioned close to one another, so that the transmitted signals from them are not significantly different in their spacial characteristics. The transmitted signals from the two remote units X and Y also have the same CAC discrete frequencies or tones. Since the CAC channel is commonly used by all remote units to make access requests to the base station, when two remote units transmit during the same interval, their tones collide, as is shown in the figure.

FIG. 1A shows the base station Z receiving the discrete multitone signals on its antenna A from the remote units X and Y. The signals are processed by a signal processor computer and stored in a memory. The memory at the receiving station Z is organized into sections called bins. Each bin is associated with one antenna at the receiving station and with one tone of the multitone set. The antenna A has separate bins in the memory for one each different tone frequency. Each bin is further divided into four sub-bins for each of the four possible phases, T1, T2, T3, and T4. FIG. 1A shows how the bins and sub-bins in the memory of station Z store the patterns of the white data received from remote unit X and the black data received from remote unit Y. The signal processor at station Z uses the process of spectral despreading, in accordance with one aspect of the PWAN system, to distinguish the white data from the black data. The base station is shown detecting a collision of the CAC tones from remote units X and Y.

Figure 2A:
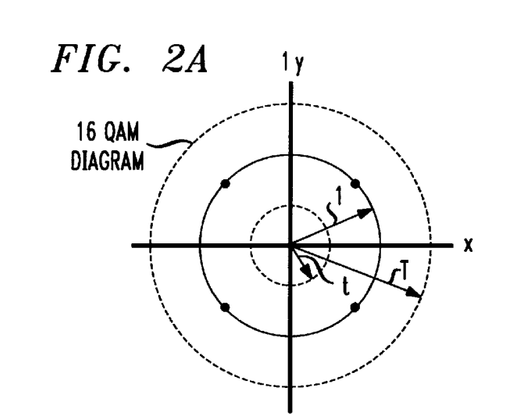
FIG. 2A is a diagram illustrating 16 QAM modulated signals for a normal transmission, a collision, and a noise event on the CAC channel.
Figure 2B:
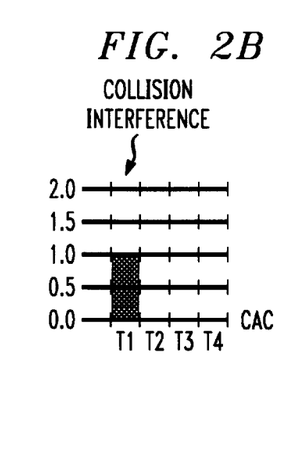
FIG. 2B is a diagram illustrating the composite signal amplitude for a collision on the CAC channel.
Figure 2C:
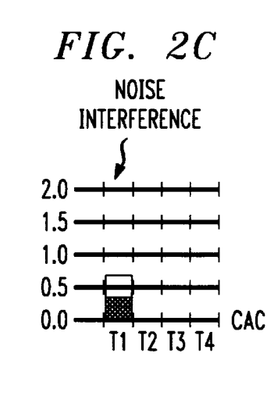
FIG. 2C is a diagram illustrating the composite signal amplitude for a noise event on the CAC channel.
Figure 2D:
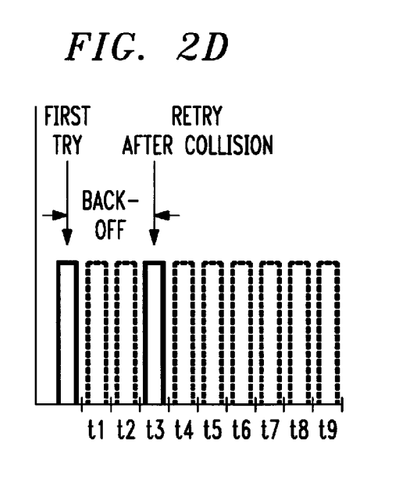
FIG. 2D is a diagram illustrating back-off and retry by a remote unit after a collision on the CAC channel.

The CAC channel transmissions are discrete tones received by the base station from one or more remote units during each reverse interval of a TDD period. The tones have been modulated with data such as an access request by the remote unit, using a 16 QAM modulation scheme. FIG. 2A is a diagram illustrating 16 QAM modulated signals for a normal transmission, a collision, and a noise event on the CAC channel. The received tones are sampled, digitized, passed through a fast Fourier transform (FFT) processor, and stored in FFT incremental frequency bins as complex numbers. These numbers represent points in a 16 QAM modulation constellation and are related to the average amount of energy of the received tone in the increment of frequency represented by the FFT bin. In accordance with the invention, the base station uses the information about the signals received, as represented by the FFT bins, to prepare notices of CAC channel conditions to be sent back to the remote units. In a first example, with no noise on the CAC channel, the average energy of the received tone represented by the numbers in the FFT frequency bins is equal to unity. In a second example, with no noise on the CAC channel, when a collision occurs between two tones that are received by the base station at the same time from two different remote units, the average energy represented by the numbers in the FFT frequency bins is greater than unity (greater than a threshold T). FIG. 2B is a diagram illustrating the composite signal amplitude for a collision on the CAC channel. In a third example, with noise on the CAC channel but no transmitted tones, the average energy of the received noise will be measurable but very small. In a fourth example, with noise on the CAC channel and a tone transmitted from a remote unit, the average energy measured will be less than expected for a tone received over a quiet CAC channel. This is due to the randomness with which the noise adds to and subtracts from the tone signal. The combination of noise and a received tone on the CAC channel will be represented by the numbers in the FFT frequency bins being less than unity (less than a threshold t). FIG. 2C is a diagram illustrating the composite signal amplitude for a noise event on the CAC channel.

Figure 1B:
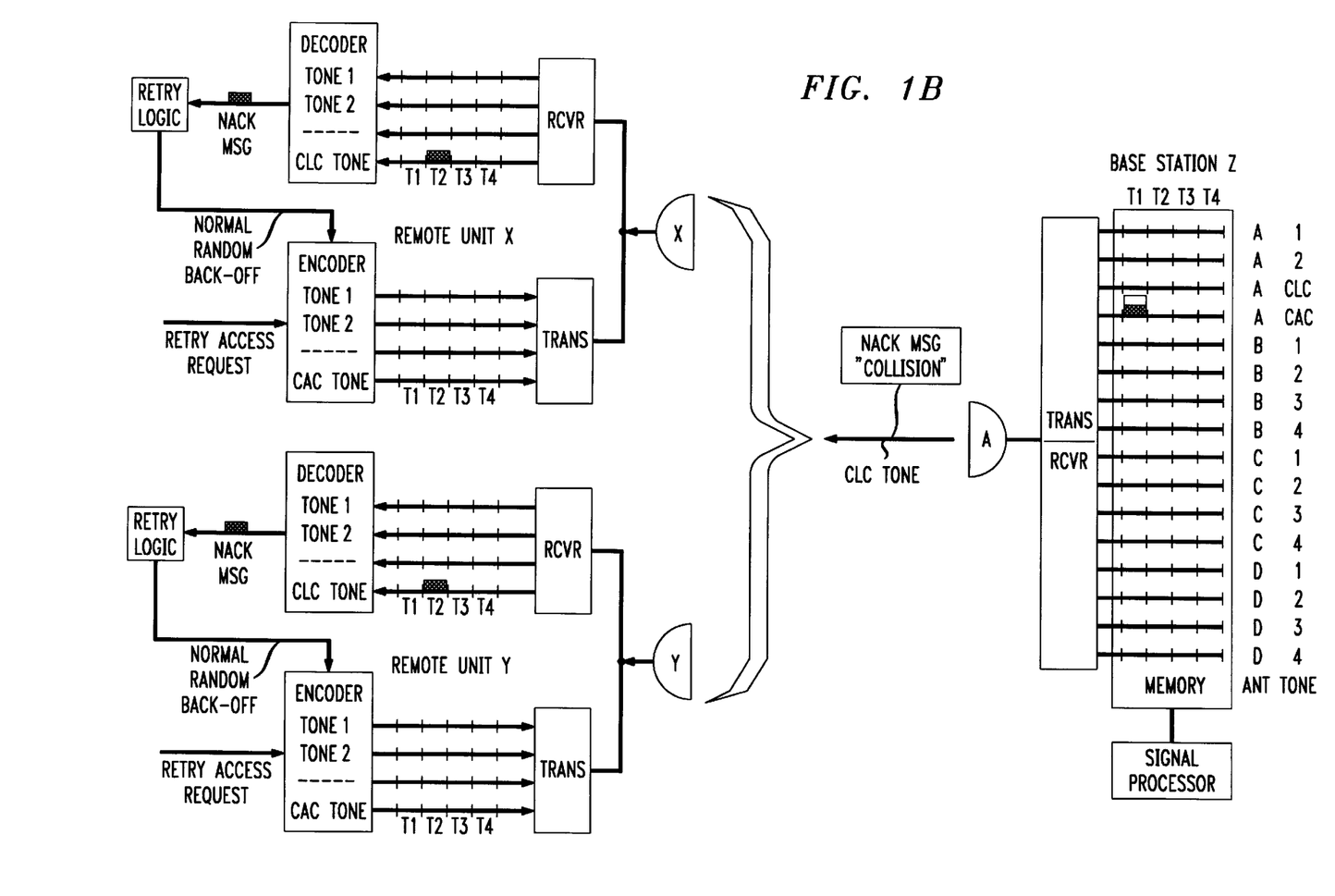
FIG. 1B is a diagram illustrating a NACK message response on the CLC channel from the base station informing the remote units that there has been a collision.
Figure 1C:
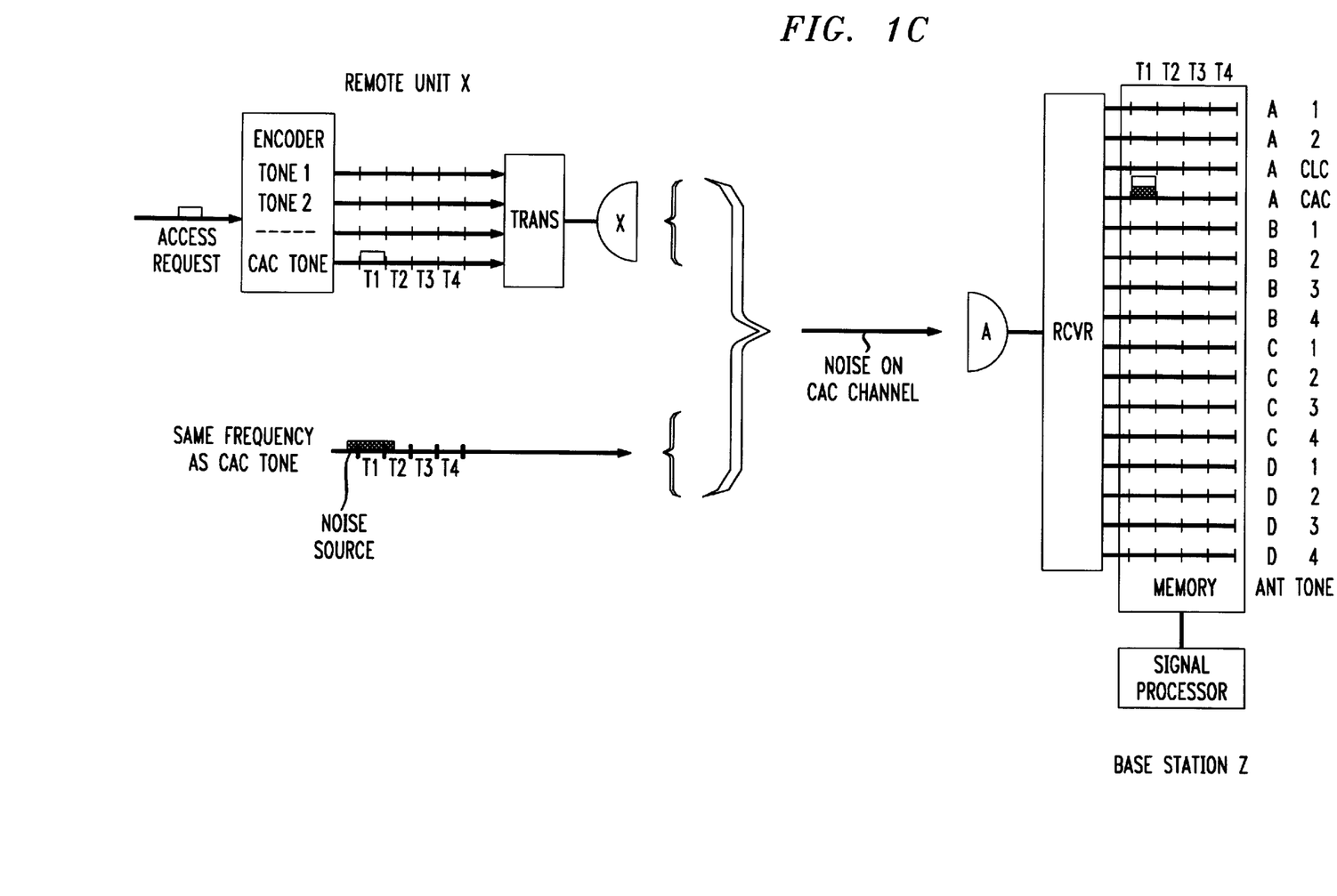
FIG. 1C is a diagram illustrating noise on the CAC channel while one remote unit attempts to gain access to the base station.
Figure 1D:
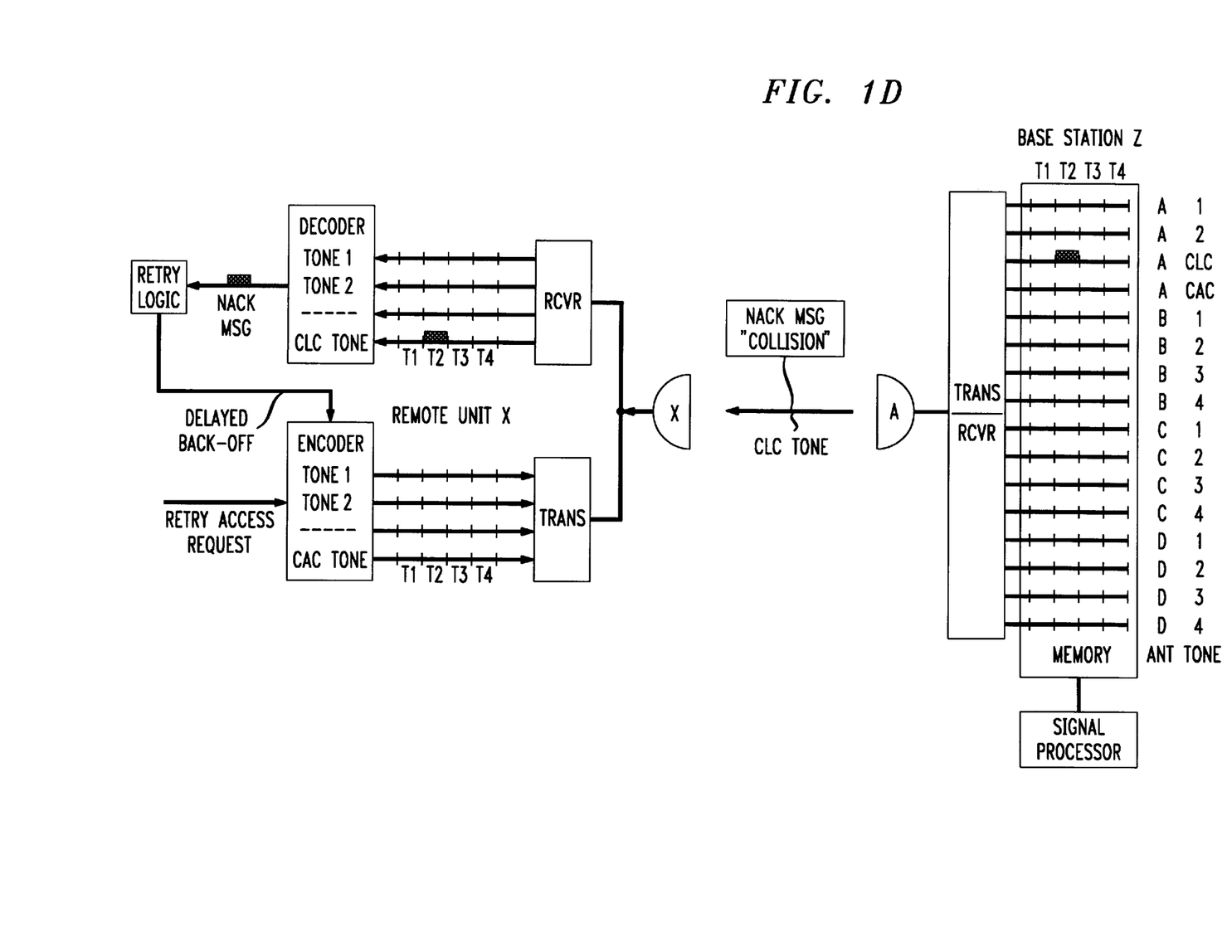
FIG. 1D is a diagram illustrating a NACK message response on the CLC channel from the base station informing the remote unit that there has been noise on the CAC channel.
Figure 2E:
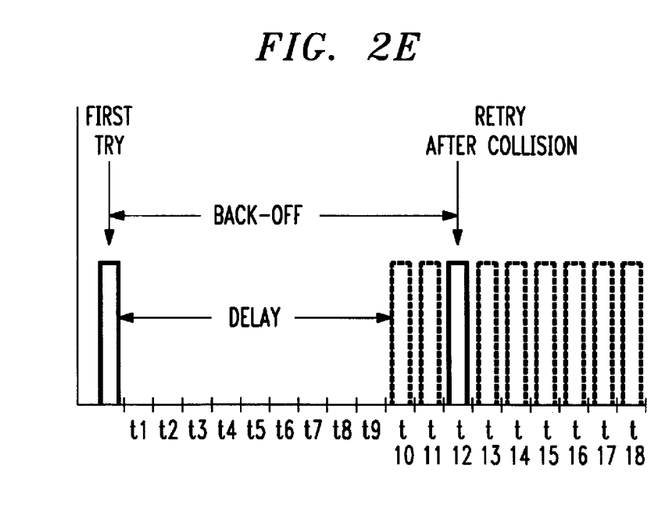
FIG. 2E is a diagram illustrating back-off and retry by a remote unit after a noise event on the CAC channel.
Figure 2F:
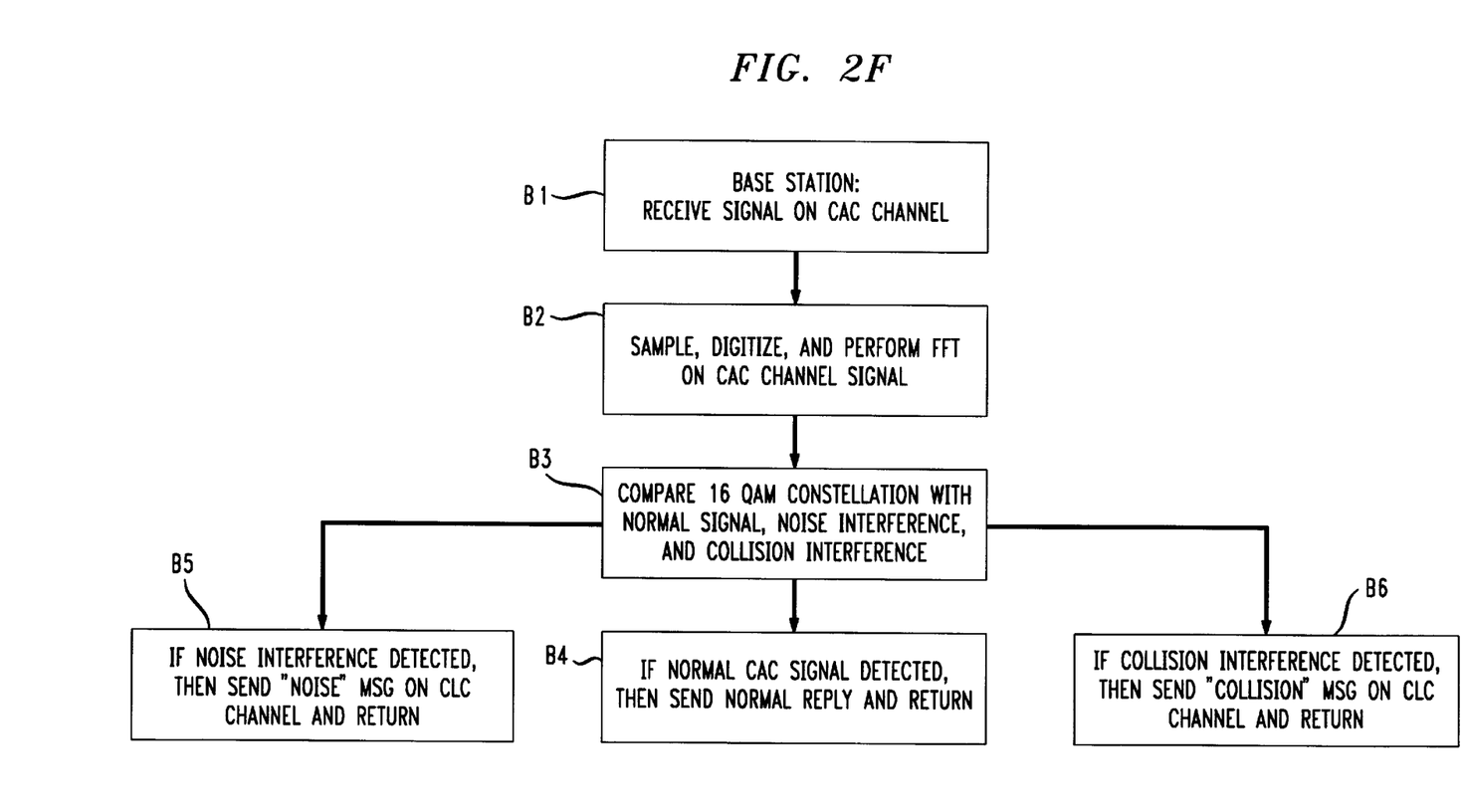
FIG. 2F is a flow diagram of the process at the base station for notifying the remote units of either a collision or a noise event on the CAC channel.

FIG. 2F is a flow diagram of the process at the base station for notifying the remote units of either a collision or a noise event on the CAC channel. Step B1 receives a signal on the CAC channel. Step B2 samples, digitizes, and performs an FFT on the CAC channel signal. Step B3 compares the 16 QAM constellation of the signal with a normal signal, noise interference, and collision interference. In step B4, in accordance with the invention, if no noise is detected by the base station on the CAC channel, then it responds with a normal reply when a tone is received on the CAC channel from a remote unit. In step B5, if noise is detected by the base station on the CAC channel when a tone is received from a remote unit, then the base station responds on the Common Link Channel (CLC) with a negative acknowledgement (NACK) signal specifying that there is noise on the CAC channel. FIG. 1C is a diagram illustrating noise on the CAC channel while one remote unit attempts to gain access to the base station. FIG. 1D is a diagram illustrating a NACK message response on the CLC channel from the base station informing the remote unit that there has been noise on the CAC channel.

In step B6 of FIG. 2F, if a collision is detected by the base station on the CAC channel when two tones have been transmitted by two remote units, as shown in FIG. 1A, then the base station responds on the CLC channel with a negative acknowledgement (NACK) signal specifying that there has been a collision on the CAC channel. FIG. 1B is a diagram illustrating a NACK message response on the CLC channel from the base station informing the remote units that there has been a collision.

In an alternate embodiment of the invention, whenever noise is detected by the base station on the CAC channel, the strength and duration and specific frequency range of the noise is measured and recorded. Only the most recent noise measurement data is retained at the base station. Then when a tone is received from a remote unit accompanied by the noise, then the base station responds on the Common Link Channel (CLC) with a negative acknowledgement (NACK) signal specifying the strength and duration and specific frequency range of the noise on the CAC channel. Alternately, the base station can periodically broadcast updates to all remote stations about the strength and duration and specific frequency range of noise bursts recently measured on the CAC channel.

Figure 2G:
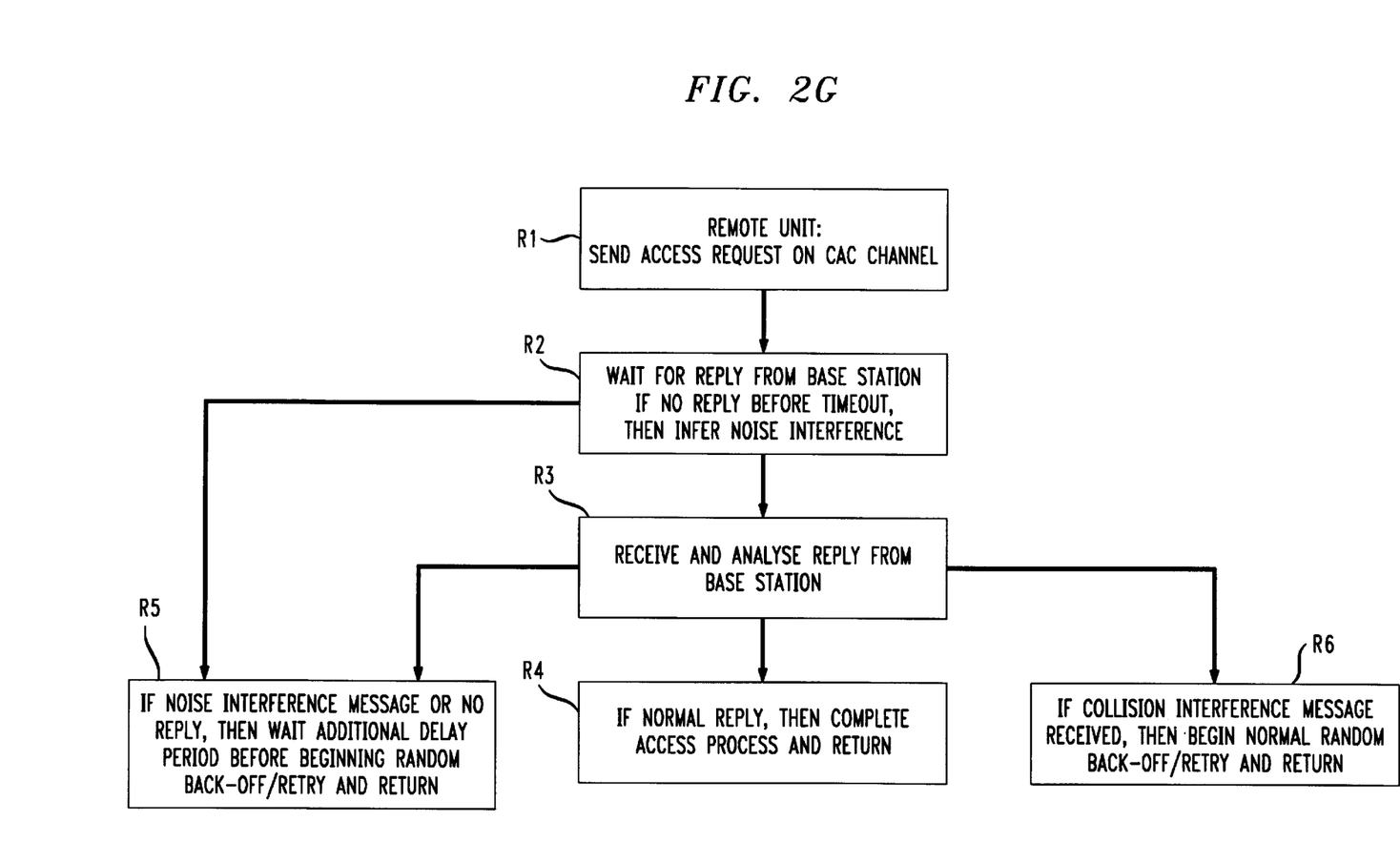
FIG. 2G is a flow diagram of the process at the remote unit for acting on notification from the base station of either a collision or a noise event on the CAC channel.

FIG. 2G is a flow diagram of the process at the remote unit for acting on notification from the base station of either a collision or a noise event on the CAC channel. In step R1, the remote unit sends an access request on the CAC channel to the base station. In step R2, in accordance with the invention, the remote unit waits for a reply on the CLC channel after it transmits an access request to the base station on the CAC channel. If the remote unit does not receive some form of response from the base unit before a timeout interval, then the remote unit infers that there is noise interference on the CAC channel and its access request did not get to the base station. Since noise bursts are typically of a longer duration than the typical back-off interval of the standard random back-off and retry protocol, the remote unit will add an extra delay period before beginning the random back-off and retry process. FIG. 2E is a diagram illustrating back-off and retry by a remote unit after a noise event on the CAC channel.

In an alternate embodiment of the invention, the duration of the extra delay period can vary in response to information received from the base station specifying the strength and duration and specific frequency range of the noise recently measured on the CAC channel.

In step R3 of FIG. 2G, if a remote unit receives a reply to its access request on the CAC channel, it analyzes the reply message to determine if it is normal reply, or if it is a NACK message indicating noise or a collision. In step R4, if the base station has sent a normal reply, then the remote unit completes the access process in the normal manner. In step R5, if the base station has sent a negative acknowledgement message indicating that there is noise on the CAC channel, then the remote unit will add an extra delay period before beginning the random back-off and retry process, as described above. FIG. 2E is a diagram illustrating back-off and retry by a remote unit after a noise event on the CAC channel.

In an alternate embodiment of the invention, the duration of the extra delay period can vary in response to information received from the base station specifying the strength and duration and specific frequency range of the noise measured on the CAC channel.

In step R6 of FIG. 2G , if the base station has sent a negative acknowledgement message indicating that there has been a collision with the tone from another remote unit on the CAC channel, then both remote units will receive the NACK message and both will begin the random back-off and retry process.

The following provides an additional explanation of how the base station determines the difference between congestion and noise. When the remote unit (RU) submits a packet to the CAC, it waits for a subsequent response from the base station, which will vary depending on the particular protocol procedure. In general, a waiting period is timed and when expiration takes place, the packet is resubmitted. However, the resubmission takes place only after a delay of some number of time periods. The number is chosen at random between 1 and some maximum number M. In the PWAN system, no information is used concerning the underlying reason for the unsuccessful transmission. In general it could be due to congestion on the channel or due to fading. In accordance with the invention, a better decision can be made if the base station distinguishes between the two cases. This enables the remote unit (RU) to use different number m not equal to M or perhaps a different random distribution altogether.

Take as a base case for comparison, the case where one RU uses the channel to transmit to the base station (Base) and no abnormal noise is present on the channel. In the Base, samples are continuously being taken via the analog to digital converter, and placed into FFT bins as complex numbers. These numbers represent points in the constellation that is determined by the chosen modulation scheme, e.g., 16 QAM for the PWAN system. With no noise, and no packet transmitted, the average energy will be 0, or $$\frac{1}{N}\sum_{j=1}^{N} x_j^2 + y_j^2 = 0$$

With no noise, when a packet is received, the average energy represented by the contents of the FFT bins is equal to 1.

$$\frac{1}{N}\sum_{j=1}^{N} x_j^2 + y_j^2 = 1$$

With no noise, when two packets are received at the same time, (i.e., a collision has occurred), the average energy will be higher still, say higher than a threshold value T, $$\frac{1}{N}\sum_{j=1}^{N} x_j^2 + y_j^2 > T$$

as in FIG. 2A. With noise present, the ambient energy measured in the FFT bins while no packet is being received will be higher than with no noise but still very small. Finally, with noise present and a packet being received, the average energy measured will be less than expected by the reception of a packet over the quiet case, say less than some threshold value t.

$$\frac{1}{N}\sum_{j=1}^{N} x_j^2 + y_j^2 > t$$

Hence the Base, in principle, has the ability to distinguish the problem of congestion from the problem of noise.

With this in mind, the operating principle of the invention is as follows. Assume the CAC channel is quiet. Two RU's send packets which collide at the Base. The Base detects this, (average energy>T) and sends an indication over the CLC channel that there is congestion. The RU's respond accordingly. Next, in the presence of noise, an RU transmits a packet to the Base, which is recognized as having the characteristics associated with noise, (average energy is<t). The Base sends out a message over the CLC indicating noise on the CAC. If the CLC message is received intact, the RU's note this fact and use it in their next attempt to access the CAC. What if the CAC message is not received intact? For the particular RU which has transmitted a packet over the CAC and is awaiting a response from the Base, and has timed out, if the noise indication message is not received on the CLC, nor any congestion message received on the CLC, then that RU assumes that the CLC message has been corrupted and responds accordingly.

In this manner, access requests from remote units are processed in the minimum amount of time in the face of varying traffic congestion and noise burst interference on the CAC channel.

In an alternate embodiment of the invention, the remote unit and the base station can exchange their respective request and response messages over the same frequency channel, such as a common broadcast channel. If either a collision or a noise burst is detected by the base station on the common chancel, the base station can respond on the same channel to the remote station with information on the conditions on the channel. The remote unit will respond as described above, with a selected type of back-off and retry operation, depending on the information in the response from the base station. If the base station's response back to the remote unit in not received by the remote unit, then after a timeout interval, the remote unit will infer that there is a noise condition on the common channel.

Still another alternate embodiment applies the above described invention in the PWAN Frequency Division Duplex Communications System described in the Alamouti, et al. patent application cited above.

The invention disclosed herein is suitable for wide application in the telecommunications field. The invention finds particular application in the personal wireless access network (PWAN) system which is described in the referenced Alamouti, et al. patent application, incorporated herein by reference.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. A highly bandwidth-efficient communications method, comprising:

receiving at a base station during a first time period a first spread signal from a first remote unit comprising a first common access channel data signal spread over a first plurality of discrete tones in accordance with a first spreading code assigned to at least the first and a second remote units;

receiving at the base station during the first time period a second spread signal from the second remote unit comprising a second common access channel data signal spread over the first plurality of discrete tones in accordance with the first spreading code;

said discrete tones being sampled, digitized, passed through a fast Fourier transform (FFT) processor, and stored in FFT incremental frequency bins as complex numbers which represent points in a OAM modulation constellation which are related to an average amount of energy of the discrete tones;

adaptively despreading the first spread signal and the second spread signal received at the base station by using first despreading codes that are based on characteristics of the received first and second spread signals;

determining at the base station that a collision has occurred between the first and second spread signals;

transmitting from the base station a notice of the collision to the first and second remote units said base station using said complex numbers to prepare said notice of the collision; and said base station distinguishing the collision from a noise burst by using said complex numbers.

2. The highly bandwidth-efficient communications method of claim 1, which further comprises:

said first and second spread signals are discrete tones received by the base station from the first and second remote units during a reverse interval of a time division duplex period.

3. The highly bandwidth-efficient communications method of claim 2, which further comprises:

said discrete tones are modulated with an access request by the first and second remote units using a 16 QAM modulation scheme.

4. A highly bandwidth-efficient communications method, comprising:

receiving at a base station during a first time period a first spread signal from a first remote unit comprising a first common access channel data signal spread over a first plurality of discrete tones in accordance with a first spreading code assigned to at least the first and a second remote units;

receiving at the base station during the first time period a second spread signal from the second remote unit comprising a second common access channel data signal spread over the first plurality of discrete tones in accordance with the first spreading code;

adaptively despreading the first spread signal and the second spread signal received at the base station by using first despreading codes that are based on characteristics of the received first and second spread signals;

determining at the base station that a collision has occurred between the first and second spread signals;

transmitting from the base station a notice of the collision to the first and second remote units;

said first and second spread signals discrete tones received by the base station from the first and second remote units during a reverse interval of a time division duplex period;

said discrete tones modulated by the first and second remote units using a QAM modulation scheme;

said discrete tones sampled, digitized, passed through a fast Fourier transform (FFT) processor, and stored in FFT incremental frequency bins as complex numbers which represent points in a QAM modulation constellation which are related to an average amount of energy of the discrete tone;

said base station using said complex numbers to prepare said notice of the collision; and said base station distinguishing the collision from a noise burst by using said complex numbers.

5. The highly bandwidth-efficient communications method of claim 1, which further comprises:

said first remote unit and said second remote unit receiving said notice and in response thereto, beginning a first type back-off and retry process to avoid a second collision.

6. The highly bandwidth-efficient communications method of claim 5, which further comprises:

said first remote unit and said second remote unit failing to receive said notice and in response thereto, beginning a second type back-off and retry process to minimize effects of noise bursts.

7. A highly bandwidth-efficient communications method, comprising:

receiving at a base station during a first time period a first spread signal from a first remote unit comprising a first common access channel data signal spread over a first plurality of discrete tones in accordance with a first spreading code assigned to at least the first and a second remote units;

receiving at the base station during the first time period a noise burst signal comprising that at least partially interferes with the first plurality of discrete tones;

said discrete tones being sampled, digitized, passed through a fast Fourier transform (FFT) processor, and stored in FFT incremental frequency bins as complex numbers which represent points in a OAM modulation constellation which are related to an average amount of energy of the discrete tones;

adaptively despreading the first spread signal and processing the noise burst signal received at the base station by using first despreading codes that are based on characteristics of the first spread signal;

determining at the base station that a noise burst has occurred while receiving the first spread signal;

transmitting from the base station a notice of the noise burst to the first remote unit;

said base station using said complex numbers to prepare said notice of the noise burst; and said base station distinguishing the noise burst from collisions with spread signals from other remote units by using said complex numbers.

8. The highly bandwidth-efficient communications method of claim 7, which further comprises:

said first spread signal is discrete tones received by the base station from the first remote unit during a reverse interval of a time division duplex period.

9. The highly bandwidth-efficient communications method of claim 8, which further comprises:

said discrete tones are modulated with an access request by the first remote unit using a 16 QAM modulation scheme.

10. A highly bandwidth-efficient communications method, comprising:

receiving at a base station during a first time period a first spread signal from a first remote unit comprising a first common access channel data signal spread over a first plurality of discrete tones in accordance with a first spreading code assigned to at least the first and a second remote units;

receiving at the base station during the first time period a noise burst signal comprising that at least partially interferes with the first plurality of discrete tones;

adaptively despreading the first spread signal and processing the noise burst signal received at the base station by using first despreading codes that are based on characteristics of the first spread signal;

determining at the base station that a noise burst has occurred while receiving the first spread signal;

transmitting from the base station a notice of the noise burst to the first remote unit;

said first spread signal discrete tones received by the base station from the first remote unit during a reverse interval of a time division duplex period;

said discrete tones modulated with an access request by the first remote unit using a QAM modulation scheme;

said discrete tones sampled, digitized, passed through a fast Fourier transform (FFT) processor, and stored in FFT incremental frequency bins as complex numbers which represent points in a QAM modulation constellation which are related to an average amount of energy of the discrete tones;

said base station using said complex numbers to prepare said notice of the noise burst; and said base station distinguishing the noise burst from collisions with spread signals from other remote units by using said complex numbers.

11. The highly bandwidth-efficient communications method of claim 7, which further comprises:

said first remote unit receiving said notice and in response thereto, beginning a first type back-off and retry process to minimize effects of the noise burst.

12. The highly bandwidth-efficient communications method of claim 11, which further comprises:

said first remote unit failing to receive said notice and in response thereto, beginning said first type back-off and retry process to minimize effects of noise bursts.

13. A highly bandwidth-efficient communications system, comprising:

means for receiving at a base station during a first time period a first spread signal from a first remote unit comprising a first common access channel data signal spread over a first plurality of discrete tones in accordance with a first spreading code assigned to at least the first and a second remote units;

means for receiving at the base station during the first time period a second spread signal from the second remote unit comprising a second common access channel data signal spread over the first plurality of discrete tones in accordance with the first spreading code;

said discrete tones being sampled, digitized, passed through a fast Fourier transform (FFT) processor, and stored in FFT incremental frequency bins as complex numbers which represent points in a OAM modulation constellation which are related to an average amount of energy of the discrete tones;

means for adaptively despreading the first spread signal and the second spread signal received at the base station by using first despreading codes that are based on characteristics of the received first and second spread signals;

means for determining at the base station that a collision has occurred between the first and second spread signals;

means for transmitting from the base station a notice of the collision to the first and second remote units;

said base station using said complex numbers to prepare said notice of the collision; and said base station distinguishing the collision from a noise burst by using said complex numbers.

14. The highly bandwidth-efficient communications system of claim 13, which further comprises:

said first and second spread signals are discrete tones received by the base station from the first and second remote units during a reverse interval of a time division duplex period.

15. The highly bandwidth-efficient communications system of claim 14, which further comprises:

said discrete tones are modulated with an access request by the first and second remote units using a 16 QAM modulation scheme.

16. A highly bandwidth-efficient communications system, comprising:

means for receiving at a base station during a first time period a first spread signal from a first remote unit comprising a first common access channel data signal spread over a first plurality of discrete tones in accordance with a first spreading code assigned to at least the first and a second remote units;

means for receiving at the base station during the first time period a second spread signal from the second remote unit comprising a second common access channel data signal spread over the first plurality of discrete tones in accordance with the first spreading code;

means for adaptively despreading the first spread signal and the second spread signal received at the base station by using first despreading codes that are based on characteristics of the received first and second spread signals;

means for determining at the base station that a collision has occurred between the first and second spread signals;

means for transmitting from the base station a notice of the collision to the first and second remote units;

said first and second spread signals discrete tones received by the base station from the first and second remote units during a reverse interval of a time division duplex period;

said discrete tones modulated with an access request by the first and second remote units using a QAM modulation scheme;

said discrete tones sampled, digitized, passed through a fast Fourier transform (FFT) processor, and stored in FFT incremental frequency bins as complex numbers which represent points in a QAM modulation constellation which are related to an average amount of energy of the discrete tones;

said base station using said complex numbers to prepare said notice of the collision; and said base station distinguishing the collision from a noise burst by using said complex numbers.

17. The highly bandwidth-efficient communications system of claim 13, which further comprises:

said first remote unit and said second remote unit receiving said notice and in response thereto, beginning a first type back-off and retry process to avoid a second collision.

18. The highly bandwidth-efficient communications system of claim 17, which further comprises:

said first remote unit and said second remote unit failing to receive said notice and in response thereto, beginning a second type back-off and retry process to minimize effects of noise bursts.

19. A highly bandwidth-efficient communications system, comprising:

means for receiving at a base station during a first time period a first spread signal from a first remote unit comprising a first common access channel data signal spread over a first plurality of discrete tones in accordance with a first spreading code assigned to at least the first and a second remote units;

means for receiving at the base station during the first time period a noise burst signal comprising that at least partially interferes with the first plurality of discrete tones;

said discrete tones being sampled, digitized, passed through a fast Fourier transform (FFT) processor, and stored in FFT incremental frequency bins as complex numbers which represent points in a OAM modulation constellation which are related to an average amount of energy of the discrete tones;

means for adaptively despreading the first spread signal and processing the noise burst signal received at the base station by using first despreading codes that are based on characteristics of the first spread signal;

means for determining at the base station a notice of the noise burst to the first remote unit;

said base station using said complex numbers to prepare said notice of the noise burst; and said base station distinguishing the noise burst from collisions with spread signals from other remote units by using said complex numbers.

20. The highly bandwidth-efficient communications system of claim 19, which further comprises:

said first spread signal is discrete tones received by the base station from the first remote unit during a reverse interval of a time division duplex period.

21. The highly bandwidth-efficient communications system of claim 20, which further comprises:

said discrete tones are modulated with an access request by the first remote unit using a 16 QAM modulation scheme.

22. A highly bandwidth-efficient communications system, comprising:

means for receiving at a base station during a first time period a first spread signal from a first remote unit comprising a first common access channel data signal spread over a first plurality of discrete tones in accordance with a first spreading code assigned to at least the first and a second remote units;

means for receiving at the base station during the first time period a noise burst signal comprising that at least partially interferes with the first plurality of discrete tones;

means for adaptively despreading the first spread signal and processing the noise burst signal received at the base station by using first despreading codes that are based on characteristics of the first spread signal;

means for determining at the base station a notice of the noise burst to the first remote unit;

said first spread signal discrete tones received by the base station from the first remote unit during a reverse interval of a time division duplex period;

said discrete tones modulated with an access request by the first remote unit using a QAM modulation scheme;

said discrete tones sampled, digitized, passed through a fast Fourier transform (FFT) processor, and stored in FFT incremental frequency bins as complex numbers which represent points in a QAM modulation constellation which are related to an average amount of energy of the discrete tones;

said base station using said complex numbers to prepare said notice of the noise burst;

said base station distinguishing the noise burst from collisions with spread signals from other remote units by using said complex numbers.

23. The highly bandwidth-efficient communications system of claim 19, which further comprises:

said first remote unit receiving said notice and in response thereto, beginning a first type back-off and retry process to minimize effects of the noise burst.

24. The highly bandwidth-efficient communications system of claim 23, which further comprises:

said first remote unit failing to receive said notice and in response thereto, beginning said first type back-off and retry process to minimize effects of noise bursts.

* * * * *